United States Patent
Benish et al.

(10) Patent No.: US 8,473,268 B2
(45) Date of Patent: Jun. 25, 2013

(54) METHOD FOR COMPARING AND BACK ALLOCATING PRODUCTION

(75) Inventors: Timothy G Benish, Pearland, TX (US); Michael E McCracken, Pearland, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 929 days.

(21) Appl. No.: 12/303,530

(22) PCT Filed: Apr. 27, 2007

(86) PCT No.: PCT/US2007/010245
§ 371 (c)(1),
(2), (4) Date: Dec. 4, 2008

(87) PCT Pub. No.: WO2008/002345
PCT Pub. Date: Jan. 3, 2008

(65) Prior Publication Data
US 2009/0198477 A1 Aug. 6, 2009

Related U.S. Application Data

(60) Provisional application No. 60/816,450, filed on Jun. 26, 2006.

(51) Int. Cl.
*G06G 7/48* (2006.01)
(52) U.S. Cl.
USPC .......................................................... 703/10
(58) Field of Classification Search
USPC .......................................................... 703/10
See application file for complete search history.

(56) References Cited

U.S. PATENT DOCUMENTS

| | | | |
|---|---|---|---|
| 3,283,570 A | 11/1966 | Hodges | |
| 4,969,130 A | 11/1990 | Wason et al. | |
| 5,706,896 A | 1/1998 | Tubel et al. | |
| 6,128,579 A | 10/2000 | McCormack et al. | |

(Continued)

FOREIGN PATENT DOCUMENTS

| | | |
|---|---|---|
| SU | 1629519 A | 2/1991 |
| WO | WO 2006/048418 A1 | 5/2006 |

OTHER PUBLICATIONS

Theuveny et al.; Multiphase flowmeter application for well and fiscal application; SPE 76766; 2002; pp. 1-12.*

(Continued)

*Primary Examiner* — Hugh Jones
(74) *Attorney, Agent, or Firm* — ExxonMobil Upstream Research Company-Law Department

(57) ABSTRACT

Methods and system for incorporating downhole and surface data with models and adjustment algorithms to back allocate flow rates of commingled zones. The models include fluid flow in the reservoir and wellbore, pressure drop across a choke, and fluid flow in the well completion. The models are coupled with an algorithm for comparing the results from the individual commingled zones to the total cumulative commingled volume and adjusting at least one predicted rate so that they match the measured flow rate over a specified time period. One method utilizes a reassignment factor for the adjustment of the predicted rates. These comparisons and allocation adjustments can be accomplished even when the frequency of the commingled flow rate and cumulative measurements, and the frequency of the predicted rates from the model differ from each other and the specified time period.

39 Claims, 9 Drawing Sheets

U.S. PATENT DOCUMENTS

| | | |
|---|---|---|
| 6,192,988 B1 | 2/2001 | Tubel |
| 6,236,894 B1 | 5/2001 | Stoisits et al. |
| 6,561,041 B1 * | 5/2003 | Eck .......................... 73/861.04 |
| 6,832,159 B2 | 12/2004 | Smits et al. |
| 6,980,940 B1 | 12/2005 | Gurpinar et al. |
| 7,089,167 B2 | 8/2006 | Poe |
| 2002/0020533 A1 | 2/2002 | Tubel |
| 2002/0043370 A1 * | 4/2002 | Poe .......................... 166/250.07 |
| 2002/0049575 A1 | 4/2002 | Jalali et al. |
| 2005/0149307 A1 | 7/2005 | Gurpinar et al. |
| 2005/0267718 A1 | 12/2005 | Guyaguler et al. |

OTHER PUBLICATIONS

Frorup, Mikael, "Waterflooding Optimization Through a Better Understanding of Production Allocation", MECOM 2005—VIII Congreso Argentino de Mecanica Computacional, Nov. 30, 2005, pp. 1425-1433, vol. XXIV, Buenos Aires, Argentina.

Goode, P., "Progress Toward the Digital Oilfield: Evolution or Revolution?", OTC 17728, 2005 Offshore Technology Conference, May 2-5, 2005, 6 pages, Houston, TX.

Hamad, Marwan et al., "Back Allocation System with Network Visualization", SPE 88747, 11$^{th}$ International Petroleum Exhibition and Conference, Oct. 10-13, 2004, 7 pages, Abu Dhabi, UAE.

Melbo, Hallgeir et al., "Software That Enables Flow Metering of Well Rates With Long Tiebacks and With Limited or Inaccurate Instrumentation", OTC 15363, 2003 Offshore Technology Conference, May 5-8, 2003, 7 pages, Houston, TX.

Melbo, Hallgeir et al., "Uncertainty Based Production Allocation Using Virtual Multiphase Flow Metering", North Sea Flow Measurement Workshop, Oct. 26-29, 2004, 9 pages, St. Andrews, Scotland.

Prabowo, H. S. et al., "A Production Allocation Method for Commingled Gas Completions", SPE 29913, International Meeting on Petroleum Engineering, Nov. 14-17, 1995, pp. 261-269, Beijing, China.

Whittaker, A. C. et al., "Improving Management and Allocation of Gas Production in Maturing Reservoirs: A Multiphase Spinner Response Model for the 21$^{st}$ Century", SPE 93135, 14$^{th}$ SPE Middle East Oil & Gas Show & Conference, Mar. 12-15, 2005, 8 pages, Bahrain.

Widarsono, B et al., "Application of Fuzzy Logic for Determining Production Allocation in Commingle Production Wells", SPE 93275, 2005 SPE Asia Pacific Oil & Gas Conference & Exhibition, Apr. 5-7, 2005, 13 pages, Jakarta, Indonesia.

European Search Report No. 114218, Nov. 15, 2006, 4 pages.

PCT International Search Report and Written Opinion, Jul. 8, 2008, 10 pages.

"Use of Subsea Wet-gas Flowmeters in Allocation Measurement Systems", American Petroleum Institute, API Recommended Practice 85, Aug. 2003, pp. 1-10, first edition, API Publishing Services, Washington, DC.

* cited by examiner

METHOD FOR COMPARING AND BACK ALLOCATING PRODUCTION

CROSS-REFERENCE TO RELATED APPLICATIONS

This application is the National Stage of International Application No. PCT/US2007/010245, filed 27 Apr. 2007, which claims the benefit of U.S. Provisional Application No. 60/816,450, filed 26 Jun. 2006.

BACKGROUND

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

FIELD OF THE INVENTION

Embodiments of the present invention generally relate to a method of calculating fluid flow from commingled zones. In particular, the invention is to a method of back allocating flow rates from a plurality of commingled zones.

DESCRIPTION OF THE RELATED ART

A common oil and gas industry practice is to commingle production, either downhole or at the surface. Where multiple zones are present in a reservoir, an economic development plan would involve commingling the production of at least some of the zones. Commingling production is also cost effective in multiple well scenarios, such as on a platform. These practices lead to uncertainty in how much fluid is produced from a given zone, such as a well or reservoir, because a single flow rate measurement is commonly taken downstream of the commingling.

Both the production rate and volume information allocated to each zone are useful for many reservoir surveillance and management tasks. For example, many techniques for estimating the remaining producible oil or gas in a reservoir depend on accurately knowing the amount of oil and/or gas produced from the reservoir in combination with the downhole pressure. History-matching oil, gas and water production data using a reservoir simulator is a common practice in workflows used for making investment decisions, such as whether or not to drill more wells or perform remedial operations on the well.

Not only does the quality of the allocated production data limit the quality of a history-matched model, but quality rate allocation is necessary to generate accurate production volumes for individual wells or reservoirs often required for regulatory reporting. This reporting is the driving force for many surface well tests, which often involve human intervention and are costly because of equipment, such as test separators, and the required production down time.

Current practices for determining individual well flow rates often involve shutting-in various wells to get single well flow rate measurements or adjusting production flow so that each well's flow rate is determined from a test separator. Wells that commingle production from stacked reservoirs often use production logging tools that have spinners, which may allow for inferring the flow rates from each perforated interval. See, e.g. Whittaker, A. C. and Lenn, C. P. (2005), "Improving Management and Allocation of Gas Production in Maturing Reservoirs: A Multiphase Spinner Response Model for the 21st Century," 14th Annual SPE Middle East Oil & Gas Show and Conference, Bahrain, SPE Paper No. 93135. More recently, flexible or "smart" completions have been employed with installed equipment that may be utilized in determining individual well flow rates. These completions allow for shutting-in certain intervals for measurement purposes.

Once individual well flow rate measurements are acquired, rate allocation methods are utilized to calculate an allocation factor for each well based on its relative production to the total. These rate allocation methods lead to additional operating costs and delayed production costs associated with periods of shut-in for each of the wells. Moreover, these methods cannot account for changes to the ratio of rates between the periodic separator tests. Furthermore, current approaches for determining individual well rates often provide rates that are inconsistent with the downhole pressure. For example, the downhole pressures may rapidly increase indicating that the well is being shut-in, but applying a constant allocation factor may allocate production to that well from another well that is not shut-in during the same period.

Several correlation-based and physics-based flow rate allocation and rate prediction methods have been proposed. For instance, one method employs an optimization algorithm to minimize the difference between predicted and measured properties, which included pressures, temperatures, and oil rates using simulation models including pipe flow models. See Melbo, H. et al. (2003), "Software that Enables Flow Metering of Well Rates with Long Tiebacks and with Limited or Inaccurate Instrumentation," Offshore Technology Conference, Paper No. 15363. One problem with this method is that the predicted production rates are not reconciled with the cumulative production. For the optimization algorithm to work properly several measurements are needed to produce a high confidence level in the model, which is often not the case for reservoir simulations.

In another method, fuzzy logic is used to calculate individual zone allocation factors based primarily on well log analysis and supported by engineering data such as bottom-hole pressures (BHPs) and fluid properties. See Widarsono, B. et al. (2005), "Application of Fuzzy Logic for Determining Production Allocation in Commingle Production Wells." 2005 SPE Asia Pacific Oil & Gas Conference and Exhibition, Jakarta, Indonesia, SPE Paper No. 93275. This method estimates the individual zone rates in the absence of a production logging run. As a result, this method provides a single allocation factor for a given surface well test (of the commingled well), and therefore, faces the same limitations present with periodic surface well tests. That is, this method does not provide a way of determining the change in relative production from each zone between surface well tests.

In an additional method, back allocating production is based on flow measurements made upstream of (before) the commingle point. See U.S. Pat. No. 6,561,041, entitled "Production Metering and Well Testing System." This method requires flow meters at each individual well, which is expensive from an instrumentation standpoint and not often seen in the industry.

In yet another method, an analytic equation based on Darcy's law assuming pseudo-steady state gas conditions to calculate the production ratios of each interval of a multi-interval reservoir has also been proposed. See Prabowo, H. S. and Rinadi, M. (1995), "A Production Allocation Method for Commingled Gas Completions," International Meeting on Petroleum Engineering, Beijing, China, SPE Paper No.

29913. Unfortunately, this method is only valid for gas reservoirs and imposes several limiting assumptions on the reservoir and fluid properties. The only proofs of concept shown to support this method are based on simulated data.

Further, another method employs a back allocation algorithm that uses an empirical relationship for the well performance in conjunction with the well head pressure to predict the flow rates. See Hamad, M., Sudharman, S., and Al-Mutairi, A. (2004), "Back Allocation System with Network Visualization," 11th Abu Dhabi International Petroleum Exhibition and Conference, Abu Dhabi, U.A.E., SPE Paper No. 88747. However, the use of empirical correlations (especially based on well head pressure) is undesirable because the correlation is probably not valid over a long period of time. Also the use of an empirical relationship may not force the cumulative production to be reconciled by this method.

In order to properly back allocate flow rates for a given zone, the total measured cumulative production should be honored, which is not enforced in most of these predictive models or methods. Typically, back allocation methods based on optimization lack additional steps needed to reconcile the modeled and/or calculated individual zones' production with the cumulative production. Conventional models that do reconcile cumulative production do not provide allocation factors that can change at relatively high frequency (e.g. less than several weeks). As such, the allocation methods that include infrequent allocation factors lack the ability to recognize shorter term (e.g. higher frequency) events, such as wells shutting-in, changes in skin, and changes in choke setting/drawdown.

Accordingly, the need exists for a more accurate method of back allocating well production by generating predicted production rates that honor the total measured cumulative commingled production. Sufficient for oil and gas production, such a method may provide a way of determining the change in relative production from each zone between surface well tests and should reduce the required number of shut-ins.

SUMMARY OF THE INVENTION

One embodiment of the invention provides a method of back allocating flow rates from a plurality of commingled zones. The method includes generating predicted flow rates, wherein each of the predicted flow rates has a frequency and corresponds to an individual zone belonging to the plurality of commingled zones; selecting a specified time period, wherein the specified time period is independent of the frequency of each of the predicted flow rates; and adjusting the predicted flow rates such that a sum of the adjusted predicted flow rates over the specified time period is substantially equal to a total commingled volume of the plurality of commingled zones over the specified time period.

Another embodiment of the invention provides a method of forcing predicted flow rates from a plurality of commingled zones to substantially match a total commingled volume of the plurality of commingled zones. The method includes collecting data necessary for a model of each of the plurality of commingled zones, exercising the model with the data for each of the plurality of commingled zones, calculating a predicted flow rate for each of the plurality of commingled zones based on the model and the data, comparing the total commingled volume of the plurality of commingled zones to a sum of the predicted flow rates over a specified time period; and adjusting the predicted flow rates such that a sum of the adjusted predicted flow rates over the specified time period matches the total commingled volume of the plurality of commingled zones over the specified time period.

Yet another embodiment of the invention provides a method for back allocating predicted rates to substantially match a measured commingled volume. The method includes comparing a sum of predicted rates integrated over time for each of a plurality of commingled zones to the measured commingled volume to determine a surplus or shortage of the predicted rates to the measured volume, and adjusting the predicted rates with the surplus or shortage such that a sum of the adjusted predicted rates integrated over time substantially equals the measured commingled volume.

Still another embodiment of the invention provides a computer-implemented method of back allocating predicted flow rates for a plurality of commingled zones to reconcile a total commingled volume of the plurality of commingled zones. The method includes collecting data for a model of each of the plurality of commingled zones; performing an analysis using at least one of a pressure transient analysis (PTA) model, a material balance model, and a history-matching process based on reservoir simulations to determine one or more characteristics for each of the plurality of commingled zones; exercising the model with the data and the characteristics for each of the plurality of commingled zones; calculating a predicted flow rate for each of the plurality of commingled zones based on the model and the data; and adjusting at least one of the predicted flow rates such that a sum of the adjusted predicted flow rates for the plurality of commingled zones over a specified is time period is substantially equal to the total commingled volume over the specified time period.

A fifth embodiment of the invention provides a method for back allocating a final predicted flow rate for an individual zone belonging to a plurality of commingled zones having a total commingled volume. The method generally includes predicting one or more initial flow rates for the individual zone using any combination of two or more rate prediction methods; applying weighting factors corresponding to each of the one or more initial predicted flow rates to generate one or more weighted predicted flow rates; calculating the final predicted flow rate for the individual zone based on the one or more weighted predicted flow rates; repeating the first three steps for each of the individual zones within the plurality of commingled zones; comparing the total commingled volume to a sum of the final predicted flow rates; and adjusting the final predicted flow rates such that a sum of the adjusted final predicted flow rates over a specified time period is substantially equal to the total commingled volume over the specified time period.

A sixth embodiment provides a system. The system generally includes a processor and a computer-readable medium containing a program for back allocating flow rates from a plurality of commingled zones, which, when executed by the processor, performs operations comprising: generating predicted flow rates, wherein each of the predicted flow rates has a frequency and corresponds to an individual zone belonging to the plurality of commingled zones; selecting a specified time period, wherein the specified time period is independent of the frequency of each of the predicted flow rates; and adjusting the predicted flow rates such that a sum of the adjusted predicted flow rates over the specified time period is substantially equal to a total commingled volume of the plurality of commingled zones over the specified time period.

A seventh embodiment provides a method of assessing flow rates from a plurality of commingled zones. The method generally includes generating predicted flow rates, wherein each predicted flow rate corresponds to an individual zone belonging to the plurality of commingled zones; integrating the predicted flow rates over a specified time period; summing the integrated predicted flow rates; and comparing the summed and integrated predicted flow rates to a total commingled volume.

An eighth embodiment discloses a method of back allocating flow rates from a plurality of commingled zones. The method generally includes generating at least one predicted flow rate ($q_j(t)$), wherein each of the at least one predicted flow rate ($q_j(t)$) corresponds to an individual zone (j) belonging to the plurality of commingled zones; utilizing the predicted flow rates ($q_j(t)$) to determine a predicted cumulative production ($Q_{j,i}$) over a specified time period ($\Delta t$) at a time index (i) for each individual zone (j) belonging to the plurality of commingled zones; determining an adjusted predicted cumulative production ($Q_{j,i}^*$) utilizing the difference ($\Delta Q_i$) between total cumulative commingled production ($Q_{T,i}$) and the sum of the predicted cumulative production $$\sum_j Q_{j,i},$$

wherein $Q_{T,i}$ is determined over $\Delta t$; and determining at least one adjusted predicted flow rate ($q_j^*(t)$) utilizing the $Q_{j,i}^*$, wherein each $q_j^*(t)$ corresponds to each $q_j(t)$.

BRIEF DESCRIPTION OF THE DRAWINGS

The foregoing and other advantages of the present invention may become apparent upon reviewing the following detailed description and drawings of non-limiting examples of embodiments in which.

DESCRIPTION OF THE INVENTION

Introduction and Definitions

Figure 1:
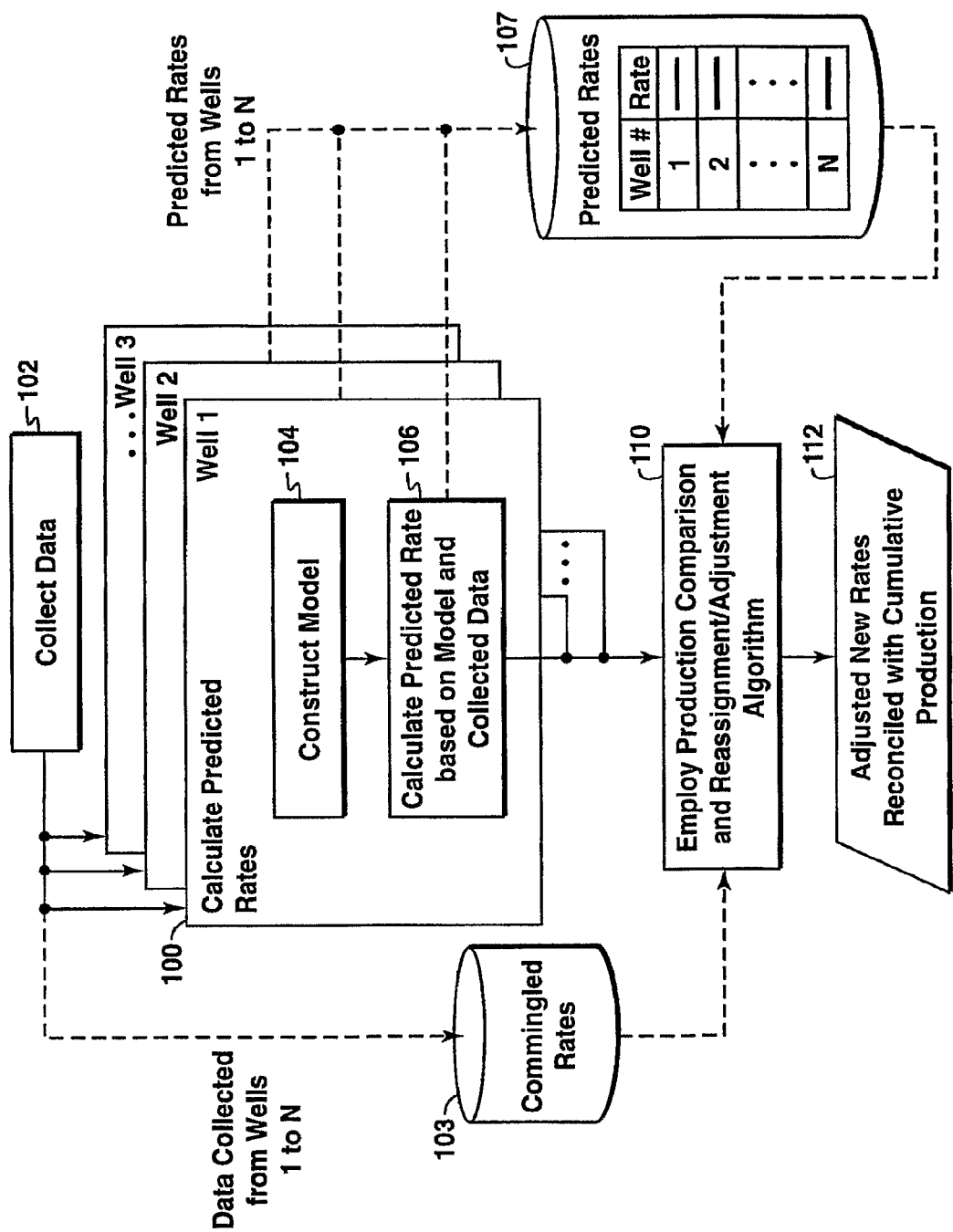
FIG. 1 is an illustration of a flowchart for back allocating production rates of individual wells according to certain embodiments of the present invention.

In the following detailed description section, the specific embodiments of the present invention are described in connection with preferred embodiments. However, to the extent that the following description is specific to a particular embodiment or a particular use of the present invention, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

Embodiments of the present invention provide methods and apparatuses for back allocating the flow rates of commingled zones including commingled wells and reservoirs by comparing predicted flow rates (e.g. flow rates predicted for individual zones based on data input to a model) to measured flow rates and adjusting the predicted flow rates to reconcile the cumulative production. For some embodiments the predicted flow rates from a combination of different models may be combined with weighting factors to generate predicted flow rates for a given zone.

As used herein, the term "commingled flow" generally refers to the production, injection, or crossflow of fluid from two or more separate zones through a single conduit. Zones contributing to commingled flow may be part of the same or different reservoirs.

As used herein, the term "cumulative flow" generally refers to the amount of flow over time. The flow may be measured or calculated over a time period.

As used herein, the term "zone" generally refers to an interval or unit of rock differentiated from surrounding rocks on the basis of its fossil content or other features, such as faults or fractures. The term zone may also refer to a discrete well within a commingled group, a section of a well with stacked intervals, or a portion of a reservoir.

As used herein, the term "reservoir" generally refers to a subsurface body of rock having sufficient porosity and permeability to store and transmit fluids.

As used herein, the terms "production" and "flow rate" may be used interchangeably and generally refer to the volume of produced fluid per unit of time and may be applied to commingled flows (e.g. commingled production) or individual zones (e.g. well production). The term "flow rate" may also refer to injection or crossflow rates.

As used herein, the term "history-matching" generally refers to a process of adjusting at least one of reservoir properties (e.g. porosity, permeability, saturations, compressibilities, etc.), fluid distribution, and well completion properties such that measured reservoir properties (e.g. downhole pressures) are substantially equal to simulator predictions.

An Exemplary General Modeling and Allocation Adjustment Method

Historically, many obstacles have discouraged the use of analytical and numerical models that predict rates from individual zones in back allocating production. As an example, production rates from individual wells change frequently, and they may not change at the same time. This makes comparing the rates between different wells difficult. Comparisons of changing production rates may be insufficient if they simply add individual commingled well rates at a certain instant and compare the sum to the measured total cumulative production rate at that same instant. Such an approach fails to consider fluid transient delays between a change in the rate at a well and a change at the point of measurement. Further complicating matters, the distances between these measurement locations can span miles, which may create sampling discrepancies at a given instant. To account for these fluid transients, comparisons according to some embodiments of the invention may be made over a specified time period expressed in suitable units, such as hours, days, or weeks. By using relatively short time periods, higher frequency events such as wells shutting-in, changes in skin, and changes in choke setting/drawdown may be accounted for in the predicted flow rates.

FIG. 1 illustrates a method for back allocating production rates of individual commingled production zones, such as wells, while the specifics for different embodiments are described in detail below. The steps for these methods may also be applied to injection rates or crossflow rates for commingled zones, including surface injection, intra-zonal injection, and well test injection, as those skilled in the art will recognize. However, the following descriptions of various embodiments focus on production since production may be the most widely used application and, as mentioned above, the production of individual zones is often required for regulatory reporting.

In step 100, a predicted production rate for a given zone (e.g. any of wells or reservoir intervals 1-$n$, where "n" may be any integer number) is calculated in steps 102, 104, and 106. To begin, downhole and/or surface data for a given zone may be collected from any suitable source, such as measurement logs or lab data as shown in step 102. The type of data collected should be based upon the type of model is planned for subsequent use. In step 103, the collected data may be stored, for example, in a database, a parseable file, or in memory for later use as described below. In step 104, the data may be input into a software program or incorporated into another means for creating a model, and the individual zone production rate model may be constructed. For some embodiments, the constructed model may be calibrated based on any suitable measured data, such as flow rate and pressure measurements, collected above in an effort to attain greater predicted flow rate accuracy. Of course, some or all of the steps of the general and more detailed methods and the modeling may be performed on any suitable computing system, such as a personal computer, a network server, or a supercomputer, as those skilled in the art will recognize.

Once the model has been constructed, the predicted production rates for this particular zone can be calculated in step 106. Steps 102, 104 and 106 may constitute the steps involved to calculate a predicted production rate for an individual zone, and this step 100 may be repeated to determine all of the predicted production rates for other zones within the commingled group (e.g. wells 1 to n). Since the predicted rates from the commingled zones may be used in later calculations, they may be stored in step 107, for example, in a database, a parseable file, or in memory according to the individual zone to which a predicted rate corresponds.

The predicted rates calculated from repeated implementations of step 106 may subsequently be compared against calculated or measured production values in step 110. If collected data was stored in step 103 and/or predicted rates were stored in step 107, then these may also be input to the comparison and adjustment algorithm of step 110.

Inasmuch as the actual production rates from each zone are not usually known because of the cost, complexity, and downtime of measuring each individual zone, the total cumulative production from all of the commingled zones ("total cumulative commingled production") may be used for comparison instead. This total cumulative commingled production value may be known from measurements (perhaps collected and stored in steps 102,103) or may be calculated by extrapolating a measurement history of total production measurements for a specified time period. Hence, the predicted rates for each zone may be used to calculate a cumulative production for each zone over a specified time period, and then the cumulative production for each zone may be summed.

This sum may then be compared against the actual total cumulative commingled production value, and the predicted production rates may subsequently be adjusted accordingly to match the measured production rate over the specified time period, as explained below in more detail. These comparisons and allocation adjustments may be executed even when the frequency of the commingled production rate measurements, the frequency of the cumulative production measurements, and the frequency of the predicted rates from the model differ. In other words, the specified time period is independent of (e.g. not limited to) the prediction frequencies. The adjusted rates 112 that have been reconciled with the cumulative production may be output for subsequent use.

An Exemplary Reservoir Modeling and Allocation Adjustment Method

Figure 2:
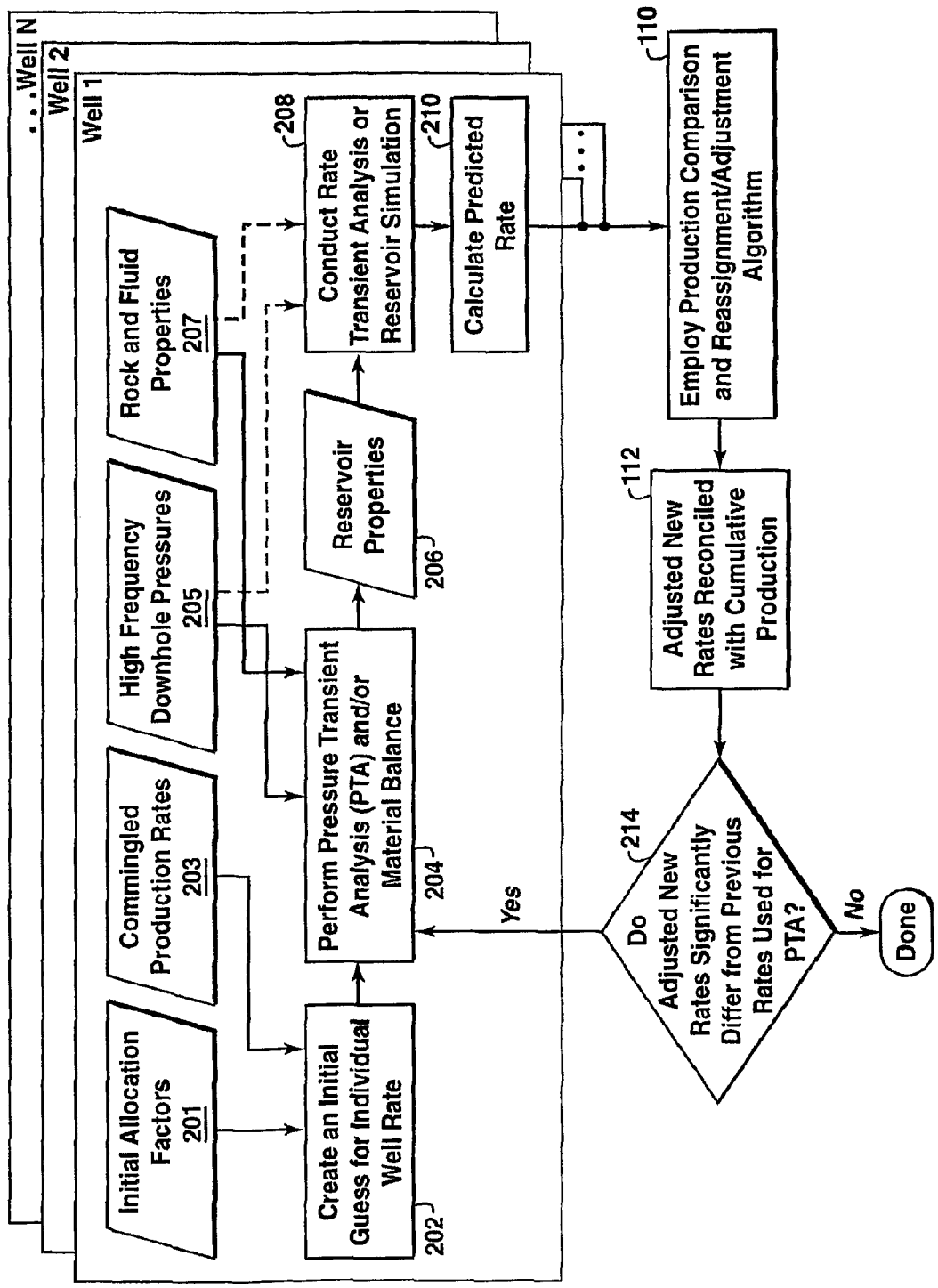
FIG. 2 is an illustration of a flowchart for back allocating production rates of individual wells based on modeling of fluid flow in a reservoir according to certain embodiments of the present invention.

One method for comparing and back allocating production rates for commingled zones may utilize pressure transient analysis (PTA), material balance (MN), and/or history-matching (HM) to analyze downhole pressure data and model the reservoir as illustrated in FIG. 2. Because the PTA may require a starting value, an initial estimate for an individual well's production rate may be created and input to the PTA in step 202. This initial estimate may be based on any suitable data or analyses therefrom including applying initial allocation factors 201 based on traditional production well tests and/or permeability thickness (kh) weighting to commingled production rates 203.

In addition to downhole pressure data 205 that may have been measured at relatively high frequency, rock and fluid properties 207 may be collected from measurement logs, lab data, and other sources and input to the PTA, MB, and/or HM in step 204. The rock and fluid properties 207 may include saturations, viscosity, rock compressibility, and the like. Once this analysis is performed, critical characteristics of the reservoir may be determined and output. These reservoir properties 206 may include kh, skin, reservoir size, and pressure support.

In step 208, the reservoir characteristics determined from PTA, MB, and/or HM may be incorporated into one or more suitable models, such as a rate transient analysis model and/or a reservoir simulator, and from these, the predicted production rate for the individual well may be calculated in step 210. Steps 202-210 may be performed on the other wells 1-$n$ in the commingled group in an effort to calculate predicted production rates for these wells.

In order to determine if the predicted production rates from the models are in agreement with the measured total production rate, the production comparison and reassignment/adjustment algorithm may be employed in step 110. Because the PTA may utilize an estimate as an initial predicted production rate, an iterative process may be applied to converge on final adjusted production rates reconciled with cumulative production. In step 214, if the adjusted rates 112 differ significantly from the previous rates used as inputs to the PTA, MB, and/or HM performed in step 204, then the process beginning at step 204 may be repeated with the recently calculated adjusted production rates for each individual well. Once the rates input to the PTA, MB, and/or HM of step 204 are nearly equal to the adjusted production rates 112—or at least converge within an acceptable limit—for all or, in some cases, nearly all the commingled wells output from step 110, then the model should have converged, and the process may stop. Such an iterative process may lead to a more accurate reservoir model, and therefore, a more accurate rate prediction.

Figure 3:
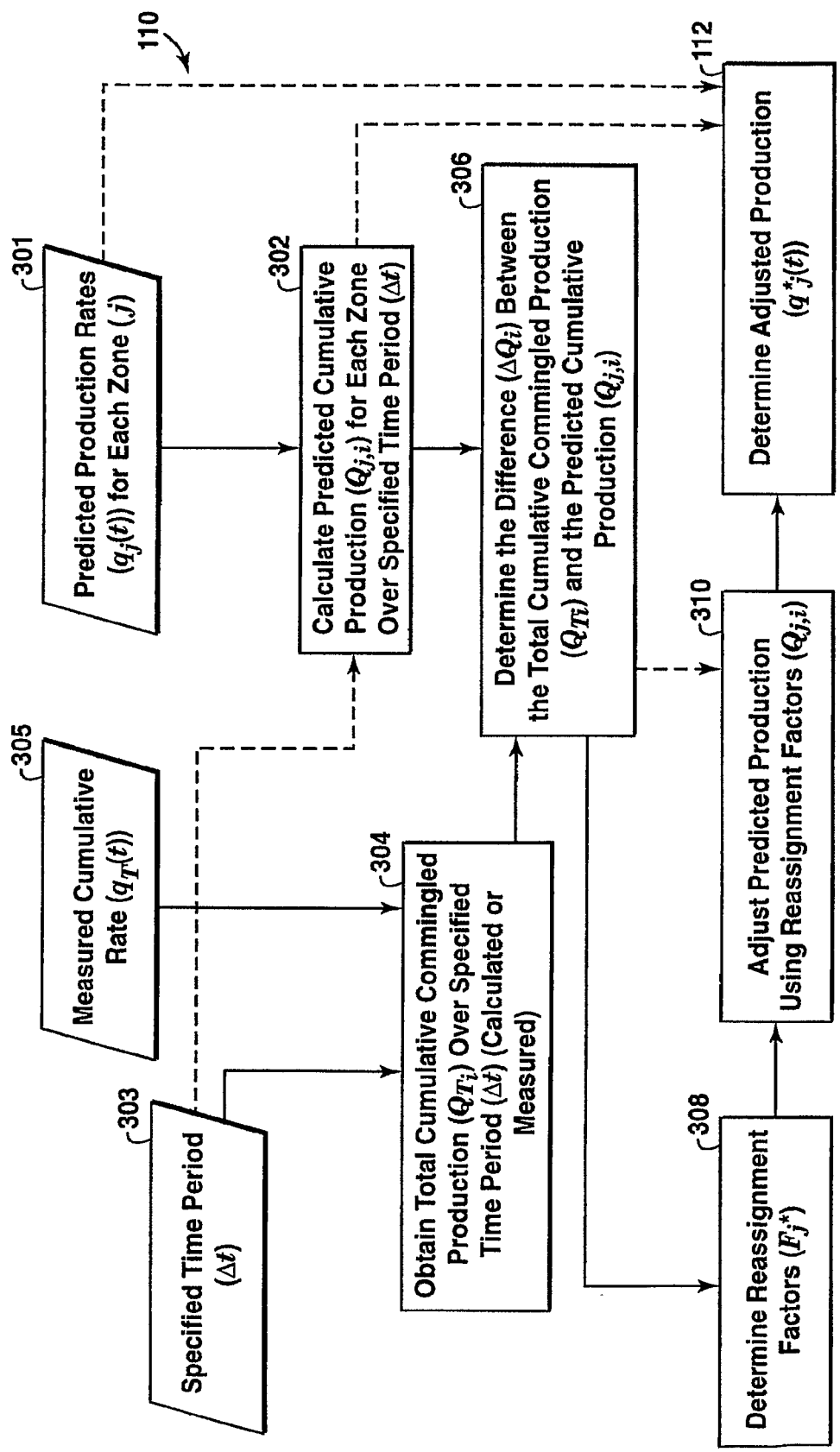
FIG. 3 is an illustration of a flowchart for a production comparison and adjustment/reassignment algorithm performed in well production rate back allocation methods of FIGS. 1 and 2 according to certain embodiments of the present invention.

FIG. 3 is an illustration of a flowchart for the production comparison and adjustment/reassignment algorithm 110 performed in well production rate back allocation methods according to certain embodiments of the present invention. The algorithm 110 may incorporate predicted production rates $q_j(t)$ 301 for each individual zone and, in step 302, may calculate the predicted cumulative production $Q_{j,i}$ for each individual zone over a specified time period ($\Delta t$) 303 that may be entered by an operator. The calculation of $Q_{j,i}$ may be performed by integrating the predicted production rate $q_j(t)$ 301 for a given zone j over the specified time period ($\Delta t$) 303. Furthermore, the predicted production rate $q_j(t)$ 301 for a given zone j may be a function of time rather than a constant, in which case it may also be a nonlinear function. For some embodiments, the integration below may be performed in step 302 where j is the zone index, i is the time index, and $t_0$ is a reference time:

$$Q_{j,i} = \int_{t_0+\Delta t \cdot (i-1)}^{t_0+\Delta t \cdot i} q_j(t)\,dt \quad (1)$$

For some embodiments, the specified time period ($\Delta t$) 303 is utilized in an effort to compare the predicted production rates $q_j(t)$ 301 with the measured cumulative rate $q_T(t)$ 305 or production volume. For example, if monthly oil volumes are the only available measurements for determining the cumulative production, a period of one month should be specified. If more frequent rate measurements are available, perhaps from a separator outlet line, the specified period 303 may be one day or less. By using shorter specified time periods ($\Delta t$) 303, the allocation method described in this section may be more able to accurately determine the production rates from individual zones because it can adjust to changes in the well or reservoir production that occur within shorter time periods than traditional approaches, such as surface well tests and production logging runs.

Returning to FIG. 3, in step 304, the measured production rate $q_T(t)$ 305 of the commingled zones may be used to calculate the total cumulative commingled production ($Q_{T,i}$) over the specified time period ($\Delta t$) 303. For some embodiments, this calculation may be made by integrating the actual total combined rate $q_T(t)$ 305 over the specified time period ($\Delta t$) 303 as shown below:

$$Q_{T,j} = \int_{t_0+\Delta t \cdot (i-1)}^{t_0+\Delta t \cdot i} q_T(t)\,dt \quad (2)$$

In at least one alternative embodiment, the total cumulative commingled production ($Q_{T,i}$) over the specified time period ($\Delta t$) 303 may already be known from measurements and may be used instead.

In step 306, the difference ($\Delta Q_i$) between the total cumulative commingled production ($Q_{T,i}$) calculated in step 304 and the sum of the predicted cumulative productions ($Q_{j,i}$) for all the individual wells of the commingled group (calculated for each individual well without summing in step 302) may be calculated as shown below:

$$\Delta Q_i = Q_{T,i} - \sum_j Q_{j,i} \quad (3)$$

This calculation involving cumulative volumes provides a comparison between the predicted and actual total production.

The difference ($\Delta Q_i$) (shortage or excess from actual production) calculated in step 306 may then be allocated back to the individual zones so that the actual cumulative production is reconciled. The difference ($\Delta Q_i$) may be a positive or negative number. Many different methods may be employed to determine the relative amount of production volume that should be allocated to each well. These may include, but are not limited to, methods based on a fraction of the individual zone's volume to the total volume, a relative productivity index (which may be a function of kh), or the relative confidence one has in the predicted rates. After a reallocation method has been decided, reassignment factors ($F_j^*$) for an individual zone may be determined in step 308 based on the chosen method. These reassignment factors ($F_j^*$) may be any number from 0 to 1. In step 310, the reassignment factors ($F_j^*$) may be multiplied with the difference ($\Delta Q_i$) calculated in step 306 and added to the predicted cumulative production ($Q_{j,i}$) for each individual zone to create adjusted predicted cumulative production numbers ($Q_{j,i}^*$) as shown below:

$$Q_{j,i}^* = Q_{j,i} + \Delta Q_i \cdot F_j^* \quad (4)$$

In step 312, adjusted production rates ($q_j^*(t)$) for each individual zone may be determined by multiplying the predicted production rate $q_j(t)$ 301 by a ratio of the adjusted predicted cumulative production ($Q_{j,i}^*$) to the originally calculated predicted cumulative production ($Q_{j,i}$) for each individual zone. With the method described in FIG. 3, these adjusted production rates ($q_j^*(t)$) should be reconciled with the predicted cumulative production ($Q_{j,i}$). Furthermore, this method may allow the adjustments to be performed nonlinearly, which may be particularly important when well hydraulics are suspected to include nonlinear flow effects, such as flow through a valve or other flow restriction devices. An equation for determining the adjusted production rates ($q_j^*(t)$) according to some embodiments can be determined by multiplying the predicted production rate $q_j(t)$ to the ratio of the adjusted predicted cumulative production ($Q_{j,i}^*$) to the originally calculated predicted cumulative production ($Q_{j,i}$) for each corresponding time interval from ($t_0+\Delta t \cdot (i-1)$) to ($t_0+\Delta t \cdot i$) as follows:

$$q_j^*(t)\Big|_{t_0+\Delta t \cdot (i-1)}^{t_0+\Delta t \cdot i} = \frac{Q_{j,i}^*}{Q_{j,i}} q_j(t)\Big|_{t_0+\Delta t \cdot (i-1)}^{t_0+\Delta t \cdot i} \quad (5)$$

As an alternative method to using the reassignment factors, the production excess or shortage may be divided equally over each zone in step 310. However, this method only provides a rudimentary solution. To obtain a more scientifically-grounded solution, the allocation adjustments should be made based on each zone's relative performance and the physics of the fluid flow as described above.

An Exemplary Wellbore Modeling and Allocation Adjustment Method

Figure 4:
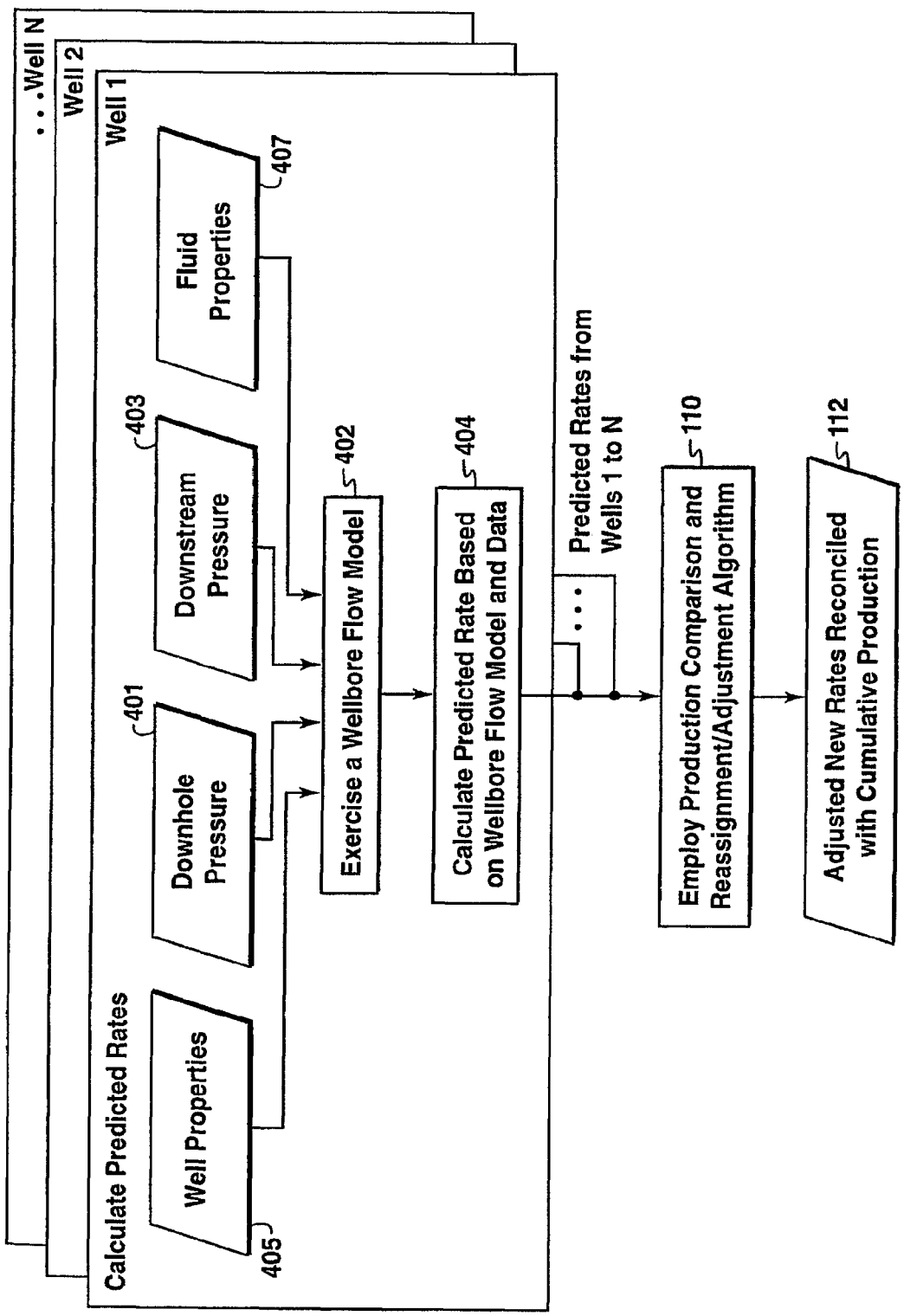
FIG. 4 is an illustration of a flowchart for back allocating production rates of individual wells based on modeling of fluid flow in a wellbore according to certain embodiments of FIGS. 1 and 3 of the present invention.

An alternative exemplary method for comparing and back allocating production rates for commingled zones is illustrated in the flowchart of FIG. 4 The fluid flow between pressure gauges during production may be modeled either in a transient or steady-state mode. The downhole pressure 401 and a downstream pressure 403 (e.g. wellhead pressure) may be measured for a given well whose properties 405, such as tubing size and roughness, may be known. In addition, properties of the fluid 407 in the given well may be known or measured and may include viscosity, the gas/oil ratio (GOR), and the water cut (the ratio of water produced compared to the volume of total fluids produced). Both of these pressures 401, 403 along with the fluid 407 and well properties 405 may be input into a wellbore flow model which may be exercised in step 402 to predict the production flow rate from the given well with a calculation performed in step 404.

In one embodiment, the wellbore flow model may be calibrated using a typical production well test or some other suitable approach. The wellbore flow model may predict the rates for each well (1-$n$) by modeling the relationship between fluid flow rates and the pressure drop between two points. Such a model may incorporate basic physics including hydrostatic losses, frictional losses, and form losses, such as diverging or converging flow though tubulars of changing diameters.

Once the predicted rates for individual wells within the commingled group (e.g. wells 1 to N) have been calculated by repeating the processes covered in steps 402 and 404 with different inputs depending on the well, the total measured production may be compared in step 110 to the model predicted rates using a production comparison and reassignment/adjustment algorithm as shown in FIG. 3 and described above. The output of step 110 should be adjusted production rates ($q^*_j(t)$) reconciled with total cumulative commingled production ($Q_{T,i}$) 112. Similar to the exemplary reservoir modeling and allocation adjustment method above, some of the steps of the exemplary wellbore modeling and allocation adjustment method may be iterated to improve the wellbore flow model based on the adjusted rates and to converge on final adjusted production rates.

An Exemplary Choke Pressure Drop Modeling and Allocation Adjustment Method

Figure 5:
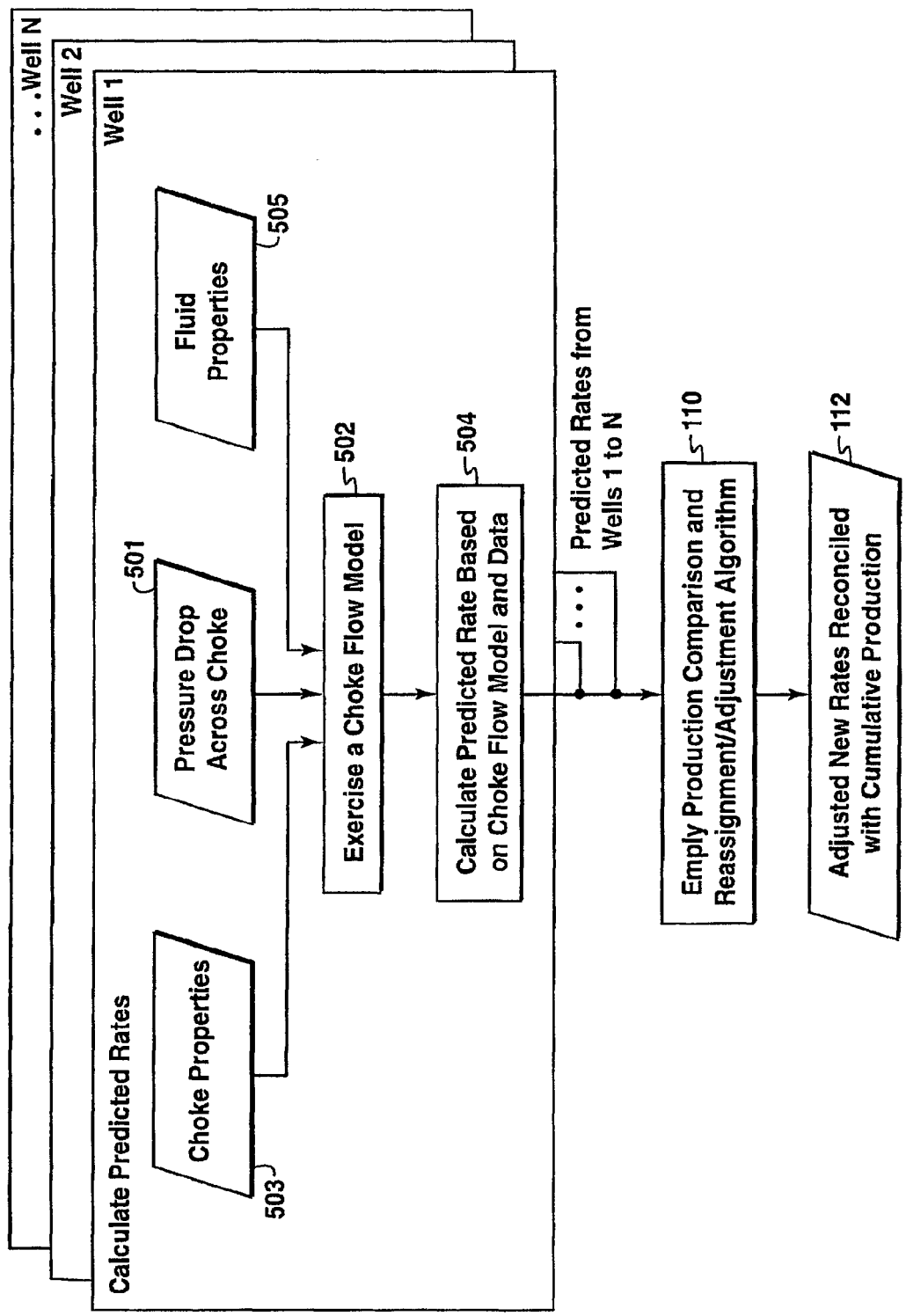
FIG. 5 is an illustration of a flowchart for back allocating production rates of individual wells based on modeling of pressure drop across a choke according to certain embodiments of FIGS. 1 and 3 of the present invention.

Another method for comparing and back allocating production rates for commingled zones is illustrated in the flowchart of FIG. 5. In this method, the pressure drop across a choke 501 may be utilized to predict the flow rate across the choke, and therefore, from the well. Treated as a flow meter, the choke may be located at the wellhead or downhole. A single-phase or multi-phase model for flow across an orifice may be employed depending on the fluids produced. The model may include other inputs such as choke properties 503 (e.g. size of the orifice) and fluid properties 505 (e.g. viscosity, GOR and water cut). The model may be calibrated using a typical production well test or another suitable approach. After inputting the necessary values and exercising the choke flow model in step 502, the predicted rates for an individual well may be calculated at step 504.

Once the predicted production rates $q_j(t)$ for individual wells within the commingled group (e.g. wells 1 to N) have been calculated by repeating the processes covered in steps 502 and 504 with different inputs depending on the well, the total cumulative commingled production ($Q_{T,i}$) should be compared in step 110 to the model predicted production rates using a production comparison and reassignment/adjustment algorithm detailed in FIG. 3 and described above. The output of step 110 should be adjusted production rates ($q^*_j(t)$) reconciled with total cumulative commingled production ($Q_{T,i}$). Similar to the other exemplary models and allocation adjustment methods described above, some of the steps of the exemplary choke pressure drop modeling and allocation adjustment method may be iterated to improve the choke flow model based on the adjusted production rates ($q^*_j(t)$) and to converge on final adjusted production rates.

An Exemplary Completion Pressure Drop Modeling and Allocation Adjustment Method

Figure 6:
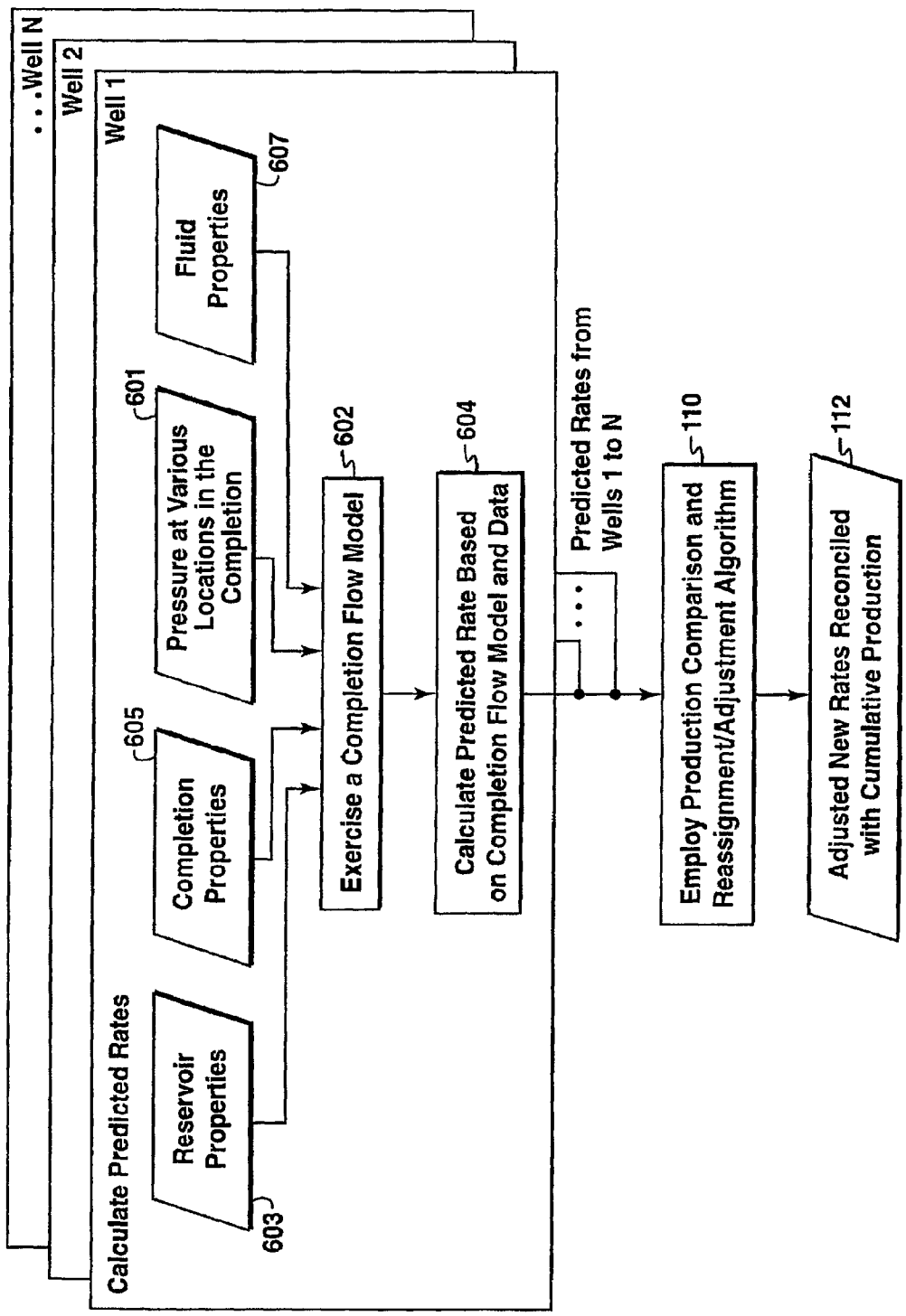
FIG. 6 is an illustration of a flowchart for back allocating production fates of individual wells based on modeling of fluid flow in a well completion according to certain embodiments of FIGS. 1 and 3 of the present invention.

Yet another alternative exemplary embodiment for comparing and back allocating production rates for commingled zones is illustrated in the flowchart of FIG. 6. In this method involving, for example, complex completions such as "smart" or "flexible" wells, pressure data 601 may be provided from multiple locations downhole. Accordingly, a series of models may be employed to represent the pressure drop across and the flow rates of different portions of the well completion. A well completion can be any configuration of hardware including, but not limited to, screens, valves, casing, tubing, gravel, nipples, or fixed chokes. The models may also be used to represent steady-state or transient flow. Simple reservoir models may be used to simulate fluid flow from the reservoir, although more complex reservoir models may be required in certain situations. Some of the reservoir properties 603 that may be suitable for some reservoir models include, but are not limited to, permeability thickness (kh), skin, reservoir volume, and/or the like. Completion properties 605, such as the type of completion and tubing properties, and fluid properties 607, such as viscosity, GOR, and water cut, may be employed by the completion flow model. Using a series of models to represent the completion flow may be particularly useful for wells producing from several stacked reservoirs.

For some embodiments, the responses of the pressure gauges may be first measured when fluids are flowing out of each reservoir interval at known rates. While an empirical relationship may be derived from this data, it is preferable to rely on a physics-based hydraulics model that relates fluid flow rates and the pressure drop between the pressure measurement locations. The hydraulics model may include at least hydrostatic losses, frictional losses, and form losses, such as diverging or converging flow though tubulars of changing diameters, flow-splitting between tubing and annular spaces, and flow through restrictions in the completion hardware (e.g. voids in sand control screens, calibrated orifices, and downhole control valves).

The use of the hydraulics model may be useful in determining the individual flow rates from each reservoir interval when the flows from each reservoir interval are commingled, resulting in a single well flow rate. In this situation, the measured pressures may be influenced by the cumulative effects of the commingled flows, invalidating any empirical relationship derived by measurements of the pressure-flow relationship when flowing fluids from a single interval.

After inputting the values and exercising the models composing the completion flow model in step 602, the predicted rates for an individual well may be calculated at step 604. Similar to the previous methods, all of the predicted rates for the individual wells within the commingled group (e.g. wells 1 to N) may be calculated by repeating the processes covered in steps 602 and 604 with the same type of inputs, but with different values depending on the well. From all of this, in cases of commingled production from multiple intervals (or reservoirs), the production comparison and reassignment/adjustment algorithm (as detailed in FIG. 3 and described above) may be applied in step 110 in an effort to obtain adjusted production rates 606 reconciled with the measured cumulative production. If the total flow rate from the well can be measured, then the total flow rate may be compared to the sum of the interval flow rates as calculated by the hydraulics model. The difference, which may be due to assumptions made in the model, calibration drift, or changes in fluid properties, can be allocated to each zone based on the production comparison and reassignment/adjustment algorithm 110 so that the sum of the rates allocated to each zone equals the total cumulative commingled production rate.

Figures 7A, 7B:
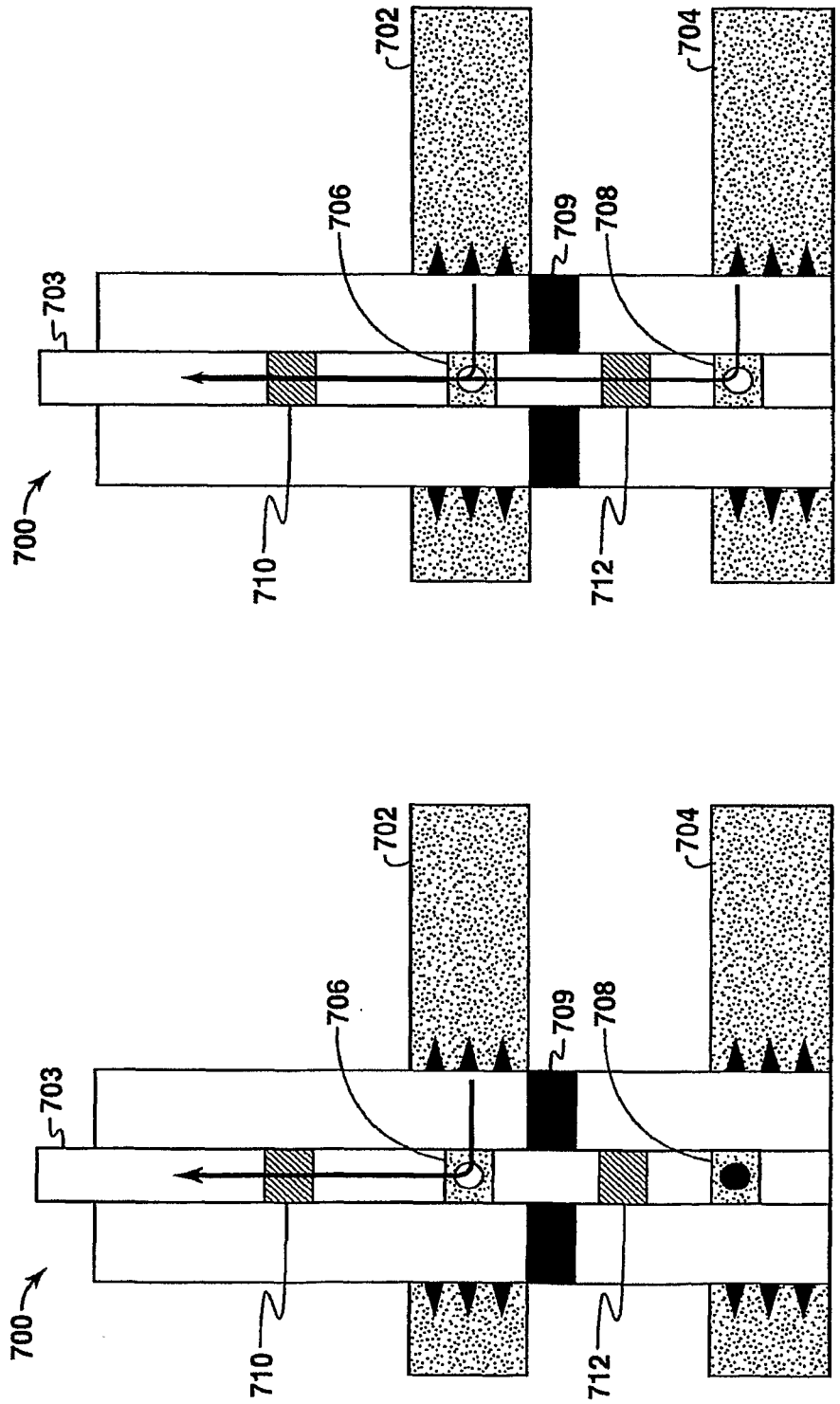
FIGS. 7A-7C are illustrative diagrams of modeling with multiple stacked reservoirs according to certain embodiments of FIG. 1 of the present invention.
Figure 7C:
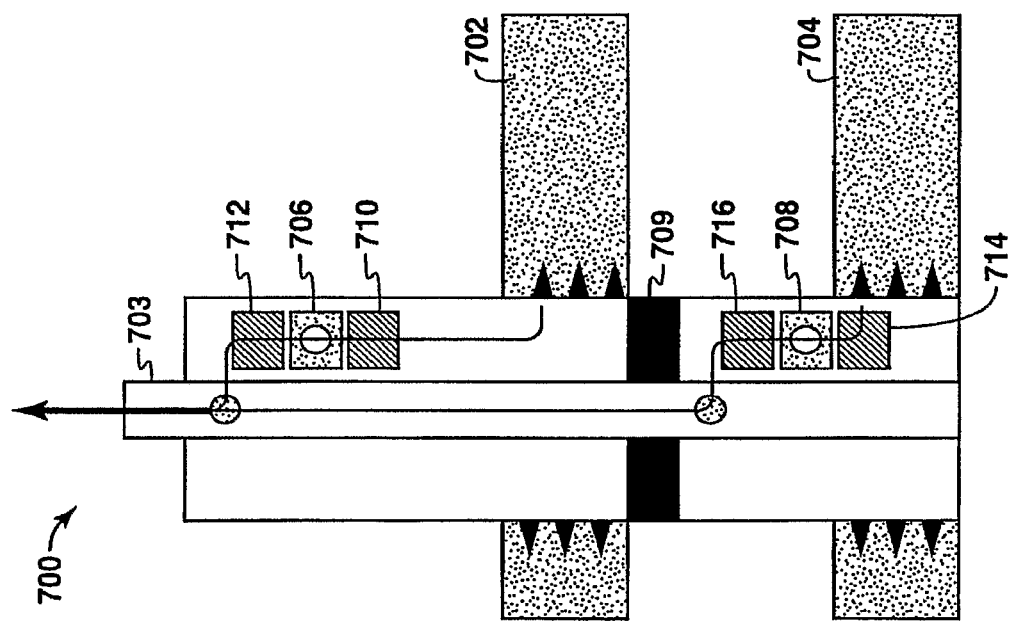

FIGS. 7A-7C are illustrative diagrams of modeling with multiple stacked reservoirs according to certain embodiments of the present invention. In FIG. 7A, a portion of a well 700 may intersect two reservoir intervals 702, 704 and may be equipped with downhole valves 706, 708. With a packer or other isolation device 709, the downhole valves 706, 708 may isolate the respective reservoir intervals 702, 704 from commingling in the tubing 703. In a calibration mode, the top valve 706 may be opened while the bottom valve 708 remains closed. If the flow rate at the surface can be measured, the relationship between the flow from the first reservoir interval 702 and the tubing pressure at a first pressure gauge (P1) 710 can be determined. The same procedure may be repeated to determine the relationship between a second pressure gauge (P2) 712 and the flow from the second reservoir interval 704 when the first reservoir interval 702 is isolated from entering the tubing 703.

However, when both valves 706, 708 are opened as shown in FIG. 7B, the flow rate between the top valve 706 and the gauge (P1) 710 should be greater than the flow rate from first reservoir interval 702. To calculate the contribution from the first reservoir interval 702, the contribution from the second reservoir interval 704 may be subtracted from the total well rate (if known), or the value may be determined from the hydraulics model by independently calculating the contribution from each reservoir interval 702, 704. However, if the number of reservoir intervals exceeds two, the former method can no longer be used, and the hydraulics model may be used to calculate the contribution from each reservoir interval.

In a specific example, the pressure measurements may be made in such a way that the flow from a specific zone may be determined without a reservoir or hydraulics model. As illustrated in FIG. 7C, the pressure measurements may be made upstream and downstream of a calibrated orifice 706, 708, in which neither the upstream nor downstream flows should be affected by the flow rates. For example, pressure gauges (P1a) 710 and (P1b) 712 may be used to measure the pressure flowing through the top valve 706. Likewise, pressure gauges (P2a) 714 and (P2b) 716 may measure the pressure on either side of the bottom valve 708. However, as in the previous discussion, a reservoir model or periodic calibration may be performed to determine the phase fractions in each zone as the phase fractions change. One skilled in the art should be able to envision several configurations in between this and the configuration described in FIG. 7B, any of which may involve some level of hydraulics or reservoir modeling.

In additional embodiments, the oil-field system may be further complicated when the valves are adjustable with multiple choke settings, in which the pressure-flow relationships may be different for each valve setting. With these different settings, the valves may be calibrated at several settings, although the hydraulics model could infer the pressure-flow relationships at positions where calibration is not performed, provided the hydraulics model contains sufficient physics.

In yet another embodiment, the hydraulics models may be calibrated using typical production well tests that alternately shut-in different producing intervals (or reservoirs) as described above. Alternatively, the hydraulics models may be calibrated by production logs—in which spinner data records fluid velocities in the tubing—or by temperature measurements (from production logs or from permanent distributed temperature measuring devices, for example). These calibrations should generally be valid until the composition or phase ratios, such as gas, oil, and water fractions, change significantly. The hydraulics models can account for the change in the calibration due to changing phase fractions; however, an additional calculation may be required to predict which reservoir interval(s) is experiencing the change in phase fractions. A reservoir model may be appropriate to make this calculation, although calibration through field measurements is recommended at periodic intervals or when higher accuracy is preferred.

In some other embodiments, the measured pressures may be used in conjunction with the hydraulics and reservoir models to infer the pressures in the reservoir. Because the allocation should be measured over time, the reservoir model may predict the reservoir interval pressure based on the amount of fluid removed from each interval (mass balance). The reservoir pressure, in turn, may aid the hydraulics model in determining the flow rate from each interval. Then, the assumed reservoir pressure can be adjusted so that the predicted well (production) rate $q_j(t)$ is reconciled with the measured total well rate or total cumulative commingled production ($Q_{T,i}$). The difference between the reservoir pressures predicted from the mass balance and hydraulics models may be used to correct the rate allocation among zones over a specified period of time ($\Delta t$).

An Exemplary Weighted Combination Modeling and Allocation Adjustment Method

Figure 8:
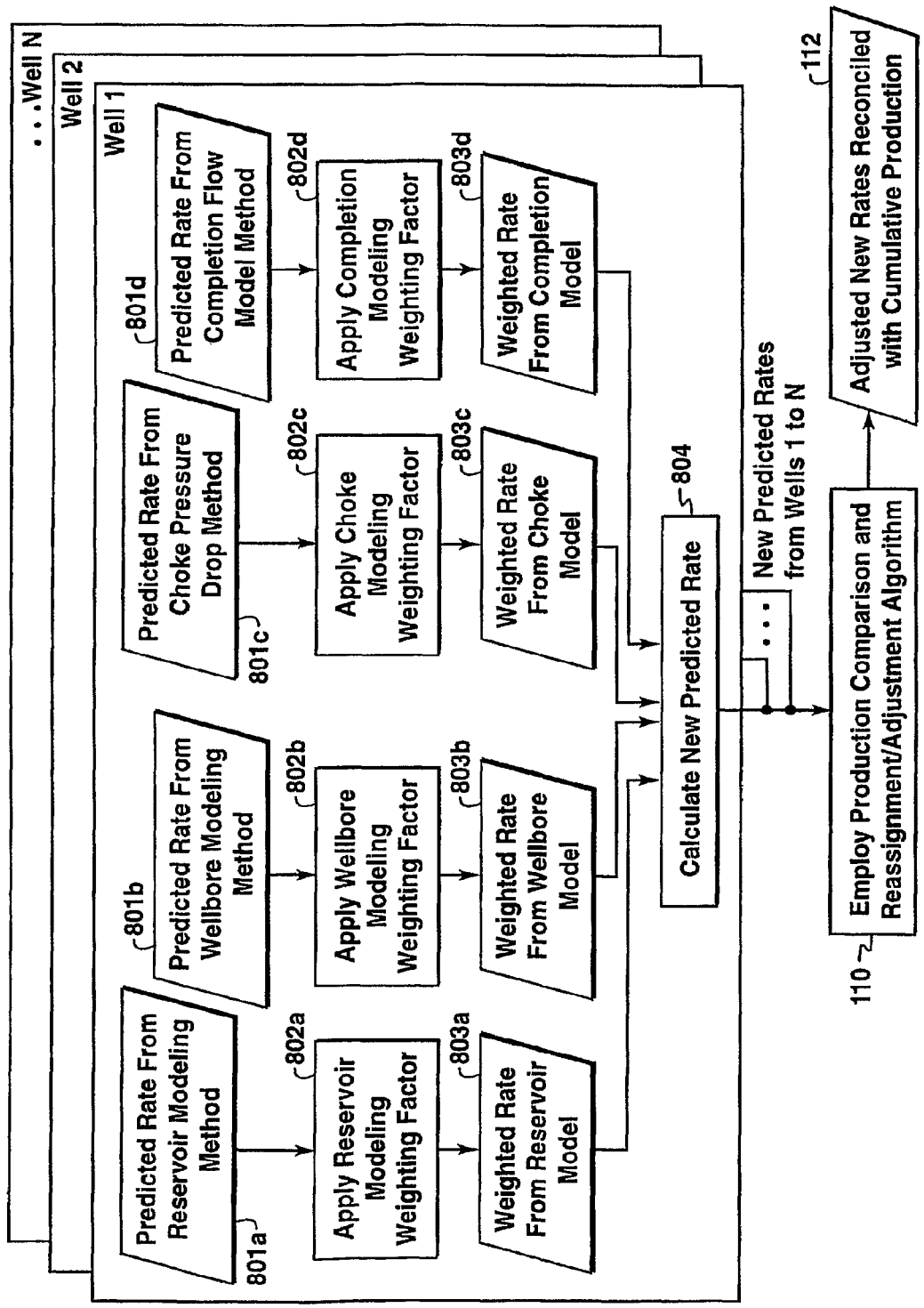
FIG. 8 is an illustration of a flowchart for back allocating production rates of individual wells based on a combination of different models of FIGS. 2, 4, 5, and 6 that may be weighted according to certain embodiments of the present invention.

In a further exemplary embodiment of the present invention, combinations of models including those described above may be employed to back allocate commingled zone rates as illustrated in FIG. 8. Using the predicted rates 801a-801d calculated from the models in steps 106, 210, 404, 504, and 604, or other models, different weighting factors may be applied in steps 802a-802d in an effort to denote the relative confidence (certainty) in each of the methods and models being combined. Engineering judgment or experience may also be used to apply the weighting factors. For some embodiments, the weighting factors may be numbers ranging from 0 to 1. If all of the predicted rates from each of the models to be combined are to be weighted equally, then the weighting factors should all be equal. Even though FIG. 8 depicts inputting all of the predicted rates from the models described above, less than all of the models may be incorporated for some embodiments.

After the weighted rates 803a-803d from each of the models to be used have been calculated, in step 804, a new predicted rate for a given zone may be calculated. This may be accomplished simply by summing the weighted rates together. Similar to the methods described above that are uncombined, the predicted rates for individual wells within the commingled group may be calculated by repeating the processes covered in steps 802a-802d and 804 for any model combination used for each of the wells. Subsequently in step 211, the total measured production should be compared to the new predicted rates calculated in step 804 for each of the commingled zones using a production comparison and reassignment/adjustment algorithm detailed in FIG. 3 and described above. The output of step 110 should be adjusted production rates ($q^*_j(t)$) reconciled with total cumulative commingled production ($Q_{T,i}$) 112.

After reading this description, those skilled in the art may recognize that, for some embodiments, an iterative process may be applied to any of the methods to converge on final adjusted flow rates reconciled with the cumulative production. If the adjusted production rates generated from step 110 differ significantly from the previous rates used as inputs to the analysis or models in the embodiments, then the method beginning with the step of exercising the model 402, 502, 602 may be repeated with the recently calculated adjusted production rates for each individual zone. Once the rates input to the models are nearly equal to the adjusted production rates—or at least converge within an acceptable limit—within a single iteration for all or, in some cases, nearly all the commingled zones output from step 110, then the models should have converged, and the process may stop. Such an iterative process may lead to a more accurate model, and therefore, a more accurate rate prediction.

While the present invention may be susceptible to various modifications and alternative forms, the exemplary embodiments discussed above have been shown only by way of example. However, it should again be understood that the invention is not intended to be limited to the particular embodiments disclosed herein. Indeed, the present invention includes all alternatives, modifications, and equivalents falling within the true spirit and scope of the appended claims.

The invention claimed is:

1. A computer implemented method of back allocating flow rates from a plurality of commingled zones, the method comprising:
   generating predicted flow rates at one or more variable prediction time intervals, each predicted flow rate corresponds to an individual zone belonging to the plurality of commingled zones;
   determining a total commingled volume of the plurality of commingled zones over a specified time period, wherein the specified time period is independent of the one or more prediction time intervals;
   calculating a sum of the predicted flow rates over the specified time period;
   determining a difference between the sum of the predicted flow rates over the specified time period and the total commingled volume; and
   adjusting the predicted flow rates based on the difference such that a sum of the adjusted predicted flow rates over the specified time period is substantially equal to the total commingled volume,
   wherein one or more of the above steps is implemented on a computer.

2. The method of claim 1, wherein at least one of the predicted flow rates is a nonlinear function of time.

3. The method of claim 1, wherein the specified time period is less than at least one of several hours, several days, and several weeks.

4. The method of claim 1, wherein the total commingled volume is one of: measured over the specified time period or calculated based on a commingled flow rate over the specified time period.

5. The method of claim 1, wherein adjusting the predicted flow rates comprises determining a difference between the total commingled volume and the sum of the predicted flow rates integrated over the specified time period.

6. The method of claim 5, wherein adjusting the predicted flow rates further comprises determining a reassignment factor for each individual zone.

7. The method of claim 6, wherein the reassignment factor is based on at least one of a fraction of an individual zone volume to a total commingled zone volume, a relative productivity index, and a relative confidence in the predicted flow rates.

8. The method of claim 6, further comprising adjusting the predicted flow rate for each individual zone integrated over the specified time period by adding the reassignment factor for each individual zone multiplied with the difference to form an adjusted cumulative volume for each individual zone.

9. The method of claim 8, wherein adjusting the predicted flow rates further comprises multiplying the predicted flow rate for each individual zone by a ratio of:
   the adjusted cumulative volume for each individual zone, to the predicted flow rate for each individual zone integrated over the specified time period.

10. The method of claim 1, wherein the predicted flow rates are at least one of predicted production rates, predicted injection rates, and predicted crossflow rates.

11. The method of claim 1, further comprising at least two different prediction time intervals.

12. A system comprising:
   a processor; and
   a computer-readable medium containing a program for back allocating flow rates from a plurality of commingled zones, which, when executed by the processor, performs operations comprising:
      generating predicted flow rates at one or more variable prediction time intervals, each predicted flow rate corresponds to an individual zone belonging to the plurality of commingled zones;
      determining a total commingled volume of the plurality of commingled zones over a specified time period, wherein the specified time period is independent of the one or more prediction time intervals;
      calculating a sum of the predicted flow rates over the specified time period;
      determining a difference between the sum of the predicted flow rates over the specified time period and the total commingled volume; and
      adjusting the predicted flow rates based on the difference such that a sum of the adjusted predicted flow rates over the specified time period is substantially equal to the total commingled volume.

13. The system of claim 12, wherein adjusting the predicted flow rates comprises determining a difference between the total commingled volume and the sum of the predicted flow rates integrated over the specified time period.

14. The system of claim 13, wherein adjusting the predicted flow rates further comprises determining a reassignment factor for each individual zone.

15. The system of claim 14, wherein adjusting the predicted flow rates further comprises adjusting the predicted flow rate for each individual zone integrated over the specified time period by adding the reassignment factor for each individual zone multiplied with the difference to form an adjusted volume for each individual zone.

16. The system of claim 15, wherein adjusting the predicted flow rates further comprises multiplying the predicted flow rate for each individual zone by a ratio of the adjusted volume for each individual zone to the predicted flow rate for each individual zone integrated over the specified time period.

17. A computer implemented method of back allocating flow rates from a plurality of commingled zones, the method comprising:
   a) collecting data for a model of each of the plurality of commingled zones;
   b) performing an analysis using at least one of a pressure transient analysis (PTA) model, a material balance model, and a history-matching process based on reservoir simulations to determine one or more characteristics for each of the plurality of commingled zones;
   c) exercising the model with the data and the one or more characteristics for each of the plurality of commingled zones;

d) calculating a predicted flow rate for each of the plurality of commingled zones based on the model and the data at one or more variable prediction time intervals; and e) adjusting at least one of the predicted flow rates such that a sum of the adjusted predicted flow rates for the plurality of commingled zones over a specified time period is substantially equal to the total commingled volume over the specified time period, wherein the specified time period is independent of the one or more prediction time intervals.

18. The method of claim 17, wherein exercising the model comprises exercising at least one of a rate transient analysis model and a reservoir simulator.

19. The method of claim 17, further comprising providing an initial estimate for each of the plurality of commingled zones based on at least one of initial allocation factors, permeability thickness (kh) weighting, and commingled rates to perform the at least one of the pressure transient analysis, the material balance, and the history-matching.

20. The method of claim 17, wherein the data comprises at least one of downhole pressures, properties of a fluid in an individual zone belonging to the plurality of commingled zones, and properties of rock in an individual zone belonging to the plurality of commingled zones.

21. The method of claim 17, further comprising repeating steps b through e with the adjusted predicted flow rates from step e input into the pressure transient analysis (PTA) until the adjusted predicted flow rates input into the PTA in step b converge within an acceptable limit to the adjusted predicted flow rates output in step e for a single iteration of steps b through e.

22. The method of claim 17, further comprising creating the model based on the one or more characteristics for each of the plurality of commingled zones.

23. The method of claim 17, further comprising repeating steps b through e with the adjusted predicted flow rates from step e input into the history-matching process until the adjusted predicted flow rates input into the process in step b converge within an acceptable limit to the adjusted predicted flow rates output in step e for a single iteration of steps b through e.

24. A method for back allocating a final predicted flow rate for an individual zone belonging to a plurality of commingled zones having a total commingled volume, the method comprising:

a) predicting one or more initial flow rates for the individual zone at a variable prediction time interval using any combination of two or more rate prediction methods;

b) applying weighting factors corresponding to each of the one or more initial predicted flow rates to generate one or more weighted predicted flow rates;

c) calculating the final predicted flow rate for the individual zone based on the one or more weighted predicted flow rates;

d) repeating steps a through c for each of the individual zones within the plurality of commingled zones;

e) comparing the total commingled volume to a sum of the final predicted flow rates; and f) adjusting the final predicted flow rates such that a sum of the adjusted final predicted flow rates over a specified time period is substantially equal to the total commingled volume over the specified time period, wherein the specified time period is independent of the prediction time interval.

25. The method of claim 24, wherein applying weighting factors comprises multiplying each of the one or more initial predicted flow rates by a number ranging from 0 to 1.

26. The method of claim 24, wherein the weighting factors are based on at least one of confidence in data collected in the one or more rate prediction methods, confidence in a model used in the one or more rate prediction methods, and engineering judgment.

27. The method of claim 24, wherein the weighting factors are equal.

28. The method of claim 24, wherein calculating the final predicted flow rate for the individual zone comprises adding the one or more weighted predicted flow rates together.

29. A method of forcing predicted flow rates from a plurality of commingled zones to substantially match a total commingled volume of the plurality of commingled zones, the method comprising:

collecting data necessary for a model of each of the plurality of commingled zones;

exercising the model with the data for each of the plurality of commingled zones;

calculating a predicted flow rate at a variable prediction time interval for each of the plurality of commingled zones based on the model and the data;

comparing the total commingled volume of the plurality of commingled zones to a sum of the predicted flow rates over a specified time period, wherein the specified time period is independent of the prediction time interval; and adjusting the predicted flow rates such that a sum of the adjusted predicted flow rates over the specified time period substantially matches the total commingled volume of the plurality of commingled zones over the specified time period.

30. The method of claim 29, wherein the specified time period is less than at least one of a month, a week, and a day.

31. The method of claim 29, wherein the model is at least one of a reservoir model, a wellbore flow model, a choke flow model, a completion flow model, and any combination thereof.

32. The method of claim 29, wherein the model is a wellbore flow model and the data comprises at least one of properties of an individual zone belonging to the plurality of commingled zones, a downhole pressure, a downstream pressure, and properties of a fluid within the individual zone.

33. The method of claim 29, wherein the model is a choke flow model and the data comprises at least one of properties of a choke, a pressure drop across the choke, and properties of a fluid flowing across the choke.

34. The method of claim 29, wherein the model is a completion flow model and the data comprises at least one of properties of an individual zone belonging to the plurality of commingled zones, properties of a completion corresponding to the individual zone, pressures in the completion, and properties of a fluid within the individual zone.

35. The method of claim 34, wherein the completion comprises a configuration of completion hardware comprising at least one of screens, valves, casing, tubing, gravel, nipples, and fixed chokes.

36. The method of claim 29, further comprising storing the data in at least one of memory, a database, and a parseable file for use in adjusting the predicted flow rates.

37. The method of claim 29, further comprising storing the predicted flow rate for each of the plurality of commingled zones in at least one of memory, a database, and a parseable file for use in adjusting the predicted flow rates.

38. The method of claim 29, wherein the predicted flow rates are at least one of predicted production rates, predicted injection rates, and predicted crossflow rates.

39. The method of claim 29, further comprising calibrating the model of each of the plurality of commingled zones based on the data.

* * * * *